US 9,255,628 B2

(12) United States Patent
Terada et al.

(10) Patent No.: US 9,255,628 B2
(45) Date of Patent: Feb. 9, 2016

(54) CHAIN TENSIONER FOR INTERNAL COMBUSTION ENGINE

(75) Inventors: Koji Terada, Saitama (JP); Shinsuke Kawakubo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 840 days.

(21) Appl. No.: 12/883,706

(22) Filed: Sep. 16, 2010

(65) Prior Publication Data

US 2011/0065538 A1 Mar. 17, 2011

(30) Foreign Application Priority Data

Sep. 16, 2009 (JP) ................... 2009-215038

(51) Int. Cl.
*F16H 7/08* (2006.01)
*F16H 7/18* (2006.01)

(52) U.S. Cl.
CPC .. *F16H 7/08* (2013.01); *F16H 7/18* (2013.01); *F16H 2007/0808* (2013.01); *F16H 2007/0893* (2013.01)

(58) Field of Classification Search
CPC ............... F16H 2007/0804; F16H 2007/0872; F16H 2007/0806; F16H 7/08
USPC ......................................... 474/111
See application file for complete search history.

(56) References Cited

U.S. PATENT DOCUMENTS

| | | | | |
|---|---|---|---|---|
| 2,141,118 A * | 12/1938 | Weller | ........................ | 474/111 |
| 3,276,282 A * | 10/1966 | Duncan | ........................ | 474/111 |
| 3,426,606 A * | 2/1969 | Hopkins | ........................ | 474/111 |
| 3,463,025 A * | 8/1969 | Poyser et al. | ................. | 474/111 |
| 4,395,250 A * | 7/1983 | King | ........................ | 474/111 |
| 4,505,691 A * | 3/1985 | Kohler | ........................ | 474/101 |
| 4,530,681 A * | 7/1985 | Kurata et al. | ................. | 474/111 |
| 6,095,938 A * | 8/2000 | Kumakura | ................. | 474/111 |
| 6,364,796 B1 * | 4/2002 | Nakamura et al. | ........... | 474/111 |
| 6,440,020 B1 * | 8/2002 | Tada | ........................ | 474/111 |
| 6,524,202 B1 * | 2/2003 | Tada et al. | ................. | 474/109 |
| 6,609,986 B1 * | 8/2003 | Wigsten | ................. | 474/111 |
| 6,612,953 B2 * | 9/2003 | Tada | ........................ | 474/111 |
| 6,902,505 B2 * | 6/2005 | Yonezawa et al. | ........... | 474/111 |
| 7,338,399 B2 * | 3/2008 | Garbagnati | ................. | 474/111 |
| 8,057,333 B2 * | 11/2011 | Haesloop | ................. | 474/111 |
| 2002/0069539 A1 * | 6/2002 | Tada | ........................ | 30/383 |
| 2009/0069133 A1 * | 3/2009 | Smart | ........................ | 474/111 |

FOREIGN PATENT DOCUMENTS

JP 58-36915 8/1983
JP 2008-002669 A 1/2008

* cited by examiner

*Primary Examiner* — William A Rivera
*Assistant Examiner* — Michael Riegelman
(74) *Attorney, Agent, or Firm* — Birch, Stewart, Kolasch & Birch, LLP (57) ABSTRACT

A chain tensioner includes a base frame secured to each of front and rear banks, a slider plate shiftable in the extending direction of the base frame, and a tensioner provided to straddle between the base frame and the slider plate. The slider plate is biased to elastically deform and arcuately bend the tensioner, which applies a tensile force to each of cam chains transmitting the rotation of a crankshaft. In the chain tensioner, upper securing portions are provided in an upper portion of the base frame so as to be secured to each of the front and rear banks in the bending direction of the tensioner. A lower end of the base frame extends to a position facing the inside of the crankcase to provide a lower securing portion which is secured to each of the front and rear banks perpendicularly to the bending direction of the tensioner.

8 Claims, 7 Drawing Sheets

CHAIN TENSIONER FOR INTERNAL COMBUSTION ENGINE

CROSS-REFERENCE TO RELATED APPLICATIONS

The present application claims priority under 35 USC 119 to Japanese Patent Application No. 2009-215038 filed on Sep. 16, 2009 the entire contents of which are hereby incorporated by reference.

BACKGROUND OF THE INVENTION

1. Field of the Invention

The present invention relates to a chain tensioner for an internal combustion engine adapted to apply tensile force to an endless chain used to transmit rotation of a crankshaft to a cylinder head.

2. Description of Background Art

A chain tensioner for an internal combustion engine is known wherein the chain tensioner includes a securing member secured to a case body of the internal combustion engine and a movable member shiftable in the extending direction of the securing member. A tensioner member provided to straddle between the securing member and the movable member is elastically deformed and arcuately bent as the movable member is biased by a spring and shifted in the biasing direction thereof. In addition, the bent tensioner member is brought into contact with the endless chain. See, for example, Japanese Utility Model Publication No. Sho 58-36915.

The above-mentioned traditional chain tensioner is mounted to a case body wherein the tensioner member is secured at its lower end to the case body by means of pins and thereafter the secured body is secured to the case body by means of bolts. The securing member is pulled toward the movable member by a spring. To align an attachment hole of the case body and an attachment hole of the secured member with each other, therefore, it is necessary to attach the bolts to both the attachment holes while aligning the attachment holes thereof with each other by deforming the tensioner member. This poses a problem with workability encountered when the chain tensioner is assembled to the case body.

SUMMARY AND OBJECTS OF THE INVENTION

The present invention has been made in view of the above-described situations and aims to improve workability encountered when a chain tensioner for an internal combustion engine is assembled to the internal combustion engine.

To achieve the above object, according to an embodiment of the present invention, a chain tensioner for internal combustion engine including a securing member secured to an internal combustion engine main body; a movable member shiftable in an extending direction of the securing member; and a tensioner member provided to straddle between the securing member and the movable member, the tensioner member being elastically deformed and arcuately bent by the movable member biased and displaced in the biasing direction thereof to apply tensile force to an endless chain transmitting rotation of a crankshaft to a cylinder head; wherein an upper securing portion is provided in an upper portion of the securing member so as to be secured to the internal combustion engine main body in a bending direction of the tensioner member and a lower end of the securing member is extended to a position facing the inside of a crankcase to provide a lower securing portion secured to the internal combustion engine main body perpendicularly to the bending direction of the tensioner member.

With this configuration, the lower securing portion of the securing member is secured to the internal combustion engine main body; therefore, when the chain tensioner is assembled to the internal combustion engine main body, the position of the securing member will not be misaligned even if the chain tensioner undergoes the biasing force of the movable member and/or the elastic force of the tensioner member. Thus, since the position of the upper securing portion of the securing member and of the mounting portion on the internal combustion engine side will not be misaligned, assembly workability for the chain tensioner can be enhanced. Since the lower securing portion located at a position facing the inside of the crankcase is secured perpendicularly to the bending direction of the tensioner member, the tensioner member can be turnably supported and is not obstructive. Thus, assembly workability can be enhanced.

In the above configuration, a lower end securing portion of the tensioner member may be turnably supported close to a crankshaft and the lower securing portion may be secured above a position where a lower end of the tensioner member is pivotally supported.

In this case, the lower end securing portion of the tensioner member is pivotally supported close to the crankshaft and the lower securing portion of the securing member is located above the lower end securing portion. Therefore, the securing member can be reduced in length so that it can be reduced in weight.

The securing member may turnably be secured by the lower securing portion.

In this case, the tensioner member and the securing member are turnably supported so that the chain tensioner is turnable. When the cylinder head is assembled, the chain tensioner can be adjusted in position by turning the chain tensioner. Thus, assembly workability can be enhanced.

The movable member may be biased by a spring toward the lower securing portion, the spring being provided between an upper end securing portion and the lower end securing portion of the tensioner member. In addition, the lower securing portion of the securing member may be located on a side opposite the tensioner member with respect to a line segment connecting the lower end securing portion with upper end securing portion of the tensioner member.

In this case, the lower securing portion of the securing member may be located inside the line segment connecting the upper end securing portion with lower end securing portion of the tensioner member. In such a case, when the chain tensioner is turned, the distance between the lower securing portion of the securing member and the upper end securing portion of the tensioner member is shortened to provide a possibility to disengage the spring. However, since the lower securing portion is provided on the side opposite the tensioner member with respect to the above-mentioned line segment, it is possible to prevent the disengagement of the spring.

The movable member may be provided at an upper end with a hole portion adapted to receive a tool inserted therethrough, the tool being used to pull up the movable member.

In this case, the chain tensioner can be pulled up by inserting the tool into the hole portion of the upper end of the movable member. Thus, work for bringing the chain tensioner into the extension state is facilitated when the endless chain is removed.

In the chain tensioner for internal combustion engine according to the present invention, the lower securing portion of the securing member is secured to the internal combustion engine main body. Therefore, when the chain tensioner is assembled to the internal combustion engine main body, the position of the securing member will not be misaligned even if the securing member undergoes the biasing force of the movable member and/or the elastic force of the tensioner member. Thus, since the position of the upper securing portion of the securing member and that of the mounting portion on the internal combustion engine side will not be misaligned with each other, assembly workability for the chain tensioner can be enhanced. Since the lower securing portion located at a position facing the inside of the crankcase is secured perpendicularly to the bending direction of the tensioner member, the tensioner member can be turnably supported and is not obstructive. Thus, assembly workability can be enhanced.

The lower end securing portion of the tensioner member is pivotally supported in the vicinity of the crankshaft and the lower securing portion of the securing member is located above the lower end securing portion. Therefore, the securing member can be reduced in length to reduce its weight.

The chain tensioner is turnable. When the cylinder head is assembled, the position of the chain tensioner can be adjusted by turning the chain tensioner. Therefore, assembly workability can be enhanced.

Further, since the distance between the lower securing portion of the securing member and the upper end securing portion of the tensioner member does not become short when the chain tensioner is turned, the disengagement of the spring can be prevented.

Furthermore, it is possible to pull up the chain tensioner by inserting the tool into the hole portion of the movable member. Therefore, work for bringing the chain tensioner into the extension state can be facilitated when the endless chain is removed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the drawings.

Figure 1:
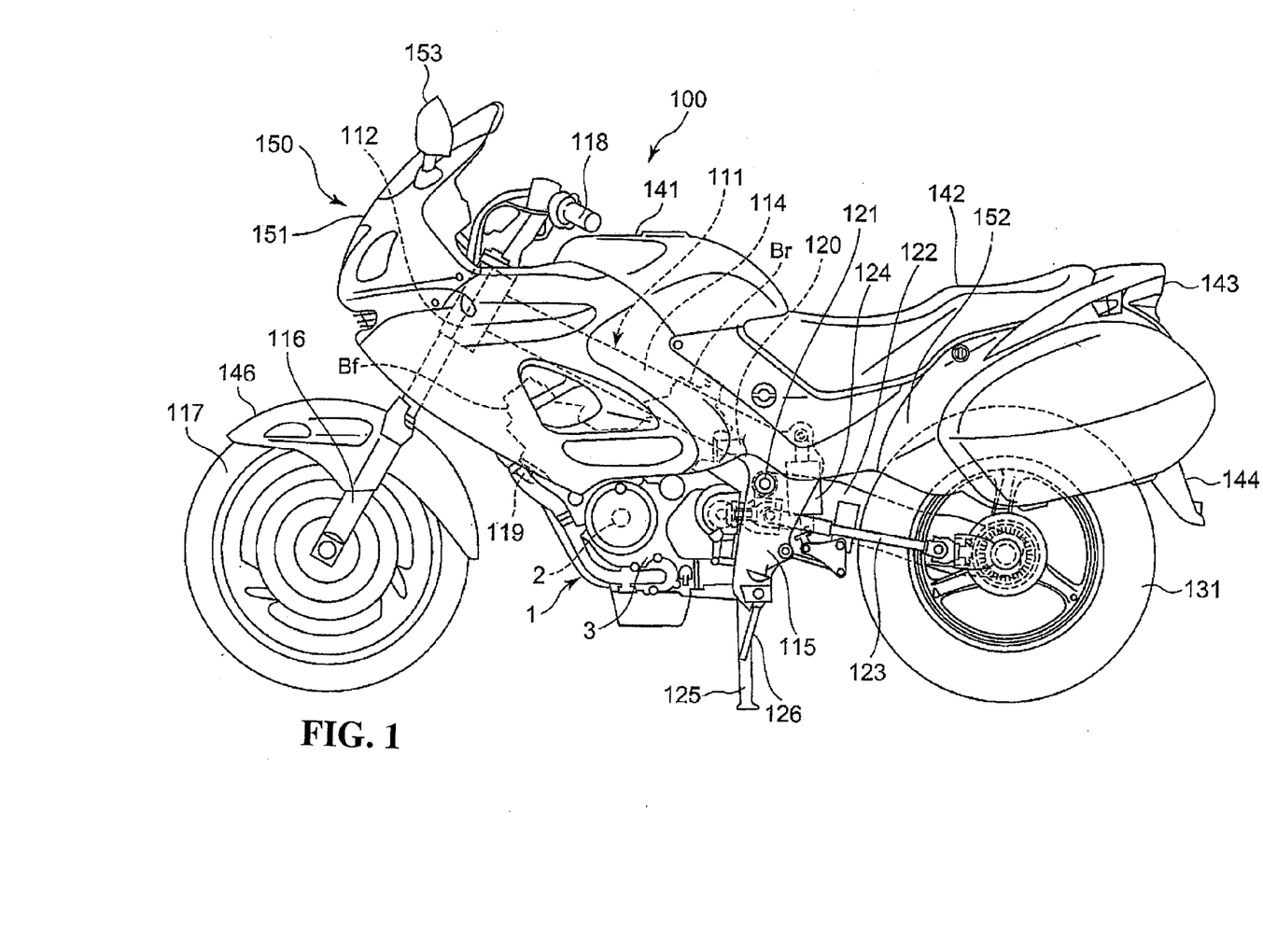
FIG. 1 is a lateral view of a motorcycle provided with a chain tensioner for an internal combustion engine according to an embodiment of the present invention.

FIG. 1 is a lateral view of a motorcycle provided with a chain tensioner for an internal combustion engine according to the embodiment of the present invention. Reference to directions such as front and rear or back, left and right, and upside and downside in the following description are based on a vehicle body.

A body frame 111 of a motorcycle 100 includes a head pipe 112 located in the front portion of the vehicle body; a pair of left and right main frames extending rearward from the head pipe 112 to the center of the vehicle body; a pair of pivot plates 115 extending downward from the corresponding rear ends of the main frames 114; and rear frames (not illustrated) extending from the corresponding rear ends of the main frames 114 to the rear portion of the vehicle.

A front fork 116 is pivotally attached to the head pipe 112. A front wheel 117 is rotatably supported by the lower end of the front fork 116. A steering handlebar 118 is attached to the upper portion of the head pipe 112.

A fore-aft V-form 4-cylinder internal combustion engine (also called the engine or the power unit) is disposed below the main frames 114. The internal combustion engine 1 is laterally arranged such that a crankshaft 2 is oriented right and left, i.e., in a horizontal direction. The engine is of an OHC water-cooled type and includes a crankcase 3. A front bank Bf (the engine main body) and a rear bank Br (the engine main body) each of which includes two cylinders and which are tilted forward and rearward, respectively, from the crankcase 3 are configured in a V-shape. In this way, the engine is configured as a narrow-angle V-form engine having a bank angle smaller than 90 degrees.

A pair of left and right exhaust pipes 119 is connected at respective one ends to an exhaust port of the front bank Bf and extend downward from the exhaust port. The exhaust pipes 119 are then arranged to extend toward the rear of the vehicle body and then collectively connected to a pair of corresponding left and right exhaust pipes 120 extending from an exhaust port of the rear bank Br. This exhaust pipe is connected via a single exhaust tube (not illustrated) to a muffler (not illustrated) installed rearward of the internal combustion engine 1.

A pivot shaft 121 is disposed rearward of the internal combustion engine 1. A rear fork 122 is attached to the pivot shaft 121 so as to be vertically swingable around the pivot shaft 121. A rear wheel 131 is rotatably supported by the rear end of the rear fork 122. The rear wheel 131 and the engine 1 are connected to each other by a drive shaft 123 installed inside the rear fork 122. Rotational power from the engine 1 is transmitted to the rear wheel 131 via the drive shaft 123. A rear cushion 124 is spanned between the rear fork 122 and the body frame 111 to absorb impact from the rear fork 122.

A stand 125 is provided at the rear portion of the engine 1 to park the vehicle body. In addition, a side stand 126 is provided at the lower portion of a left lateral surface of the engine 1.

A fuel tank 141 is mounted on the main frames 114 so as to cover the internal combustion engine 1 from above. A seat 142 is located in rear of the fuel tank 141 and supported by the rear frames. A tail lamp 143 is disposed in rear of the seat 142. A rear fender 144 is disposed below the tail lamp 143 so as to cover the rear wheel 131 from above.

The motorcycle 100 includes a resin-made body cover 150 which covers the vehicle body. The body cover 150 includes a front cover 151 which continuously covers from the front of the body frame 111 to the front of the engine 1 and a rear cover 152 which covers the underside of the seat 142. A pair of left and right mirrors 153 is attached to the upper portion of the front cover 151. A front fender 146 is attached to the front fork 116 to cover the front wheel 117 from above.

Figure 2:
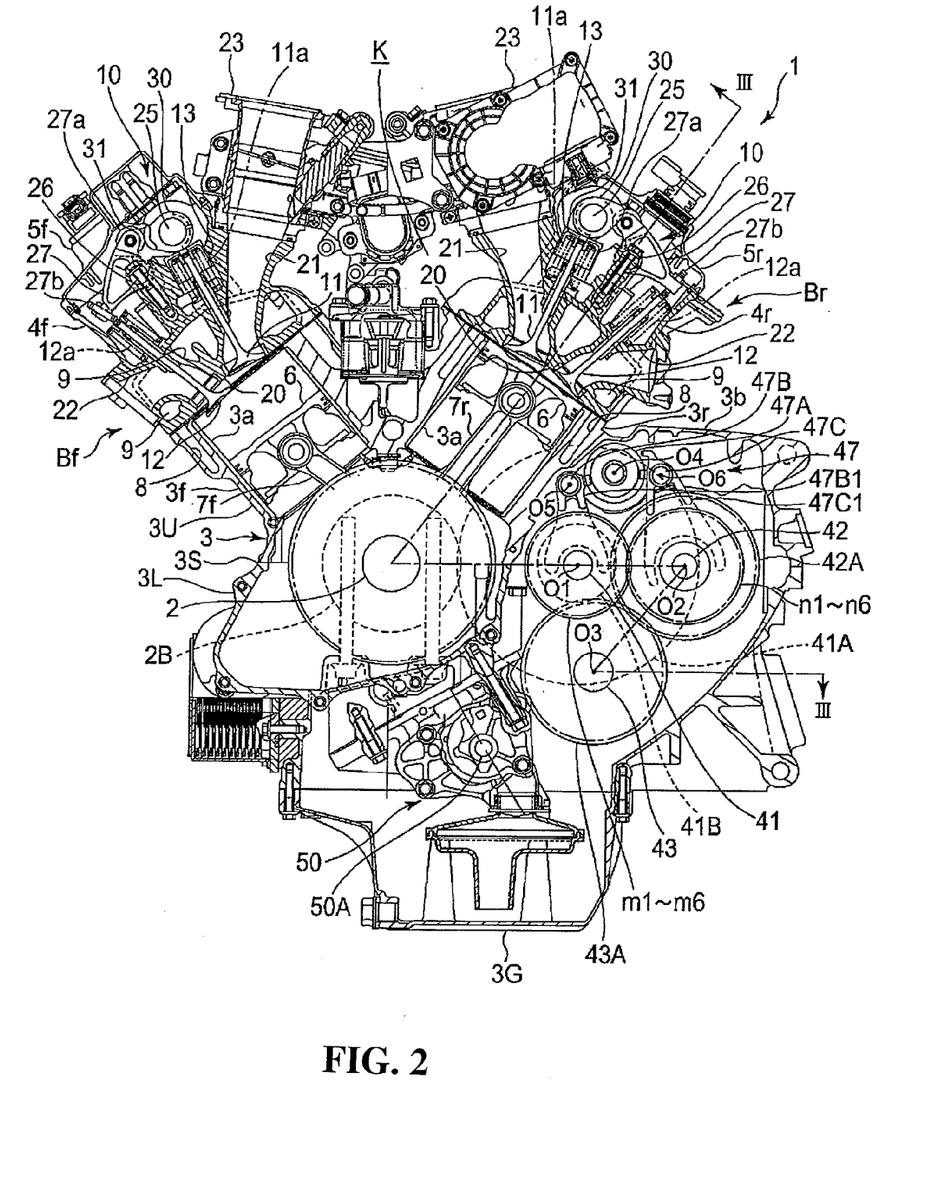
FIG. 2 is a cross-sectional view of the internal combustion engine.

FIG. 2 is a cross-sectional view of the internal combustion engine 1. A description is given in FIG. 2 by taking the upside and downside of the figure as those of the engine 1 and by taking the left and right of the figure as the front side and rear side, respectively, of the engine 1.

A V-bank space K which is a space formed in a V-shape as viewed from the side is defined between the front bank Bf and the rear bank Br.

The crankcase 3 is configured to be vertically split into an upper crankcase 3U and a lower crankcase 3L. The crankshaft 2 is rotatably supported so as to be put between the crankcases 3U, 3L. A front cylinder block 3f and a rear cylinder block 3r in each of which the two cylinders are aligned right and left are formed integrally with the upper crankcase 3U so as to extend obliquely upward to be V-shaped as viewed from the side.

An oil pan 3G in which oil for the internal combustion engine 1 is stored is installed in the lower portion of the lower crankcase 3L so as to protrude downward. An oil pump 50 adapted to circulate oil in the engine 1 is located below the crankshaft 1 in the lower crankcase 3L.

A front cylinder head 4f (cylinder head) is put on the front cylinder block 3f so as to be located forwardly and obliquely upward thereof and fastened thereto by means of fastening bolts (not illustrated). A front cylinder head cover 5f covers the front cylinder head 4f from above. Similarly, a rear cylinder head 4r (cylinder head) is put on the rear cylinder block 3r so as to be located rearwardly and obliquely upward thereof and fastened thereto by means of fastening bolts (not illustrated). A rear cylinder head cover 5r covers the front cylinder head 4r from above.

The front cylinder block 3f and the rear cylinder block 3r are each formed with a cylinder bore 3a. A piston 6 is disposed in the cylinder bore 3a so as to reciprocate therein. The pistons 6 are connected via corresponding connecting rods 7f, 7r to the single crankshaft 2 shared thereby.

The cylinder blocks 3f, 3r are each provided with a water jacket 8 so as to surround the cylinder bore 3a. Cooling water flows in the water jacket 8 to cool each of the cylinder blocks 3f, 3r.

The front cylinder head 4f and the rear cylinder head 4r are each provided with combustion chambers 20, intake ports 21 and exhaust ports 22 which are located above the corresponding cylinder bore 3a. A throttle body 23 adapted to adjust an amount of mixture flowing in the intake port 21 is connected to the intake port 21.

The cylinder heads 4f, 4r are each provided with a water jacket 9 so as to surround the intake ports 21 and the exhaust ports 22. Cooling water flows in the water jacket 9 to cool each of the cylinder heads 4f, 4r.

In each of the cylinder heads 4f, 4r, a pair of intake valves 11 is disposed in an openable and closable manner so as to be biased by corresponding valve springs 11a in a direction of closing the intake port 21 (a valve-closing direction). In addition, a pair of exhaust valves 12 is disposed in an openable and closable manner so as to be biased by corresponding valve springs 12a in a direction of closing the exhaust port 22.

The intake valves 11 and the exhaust valves 12 are drivingly opened and closed by a uni-cam valve train 10 in which they are driven by a camshaft 25 disposed in each of the cylinder heads 4f, 4r.

The valve train 10 includes a camshaft 25 rotatably supported by each of the cylinder heads 4f, 4r above the intake valves 11; a rocker shaft 26 having an axis parallel to the camshaft 25 and secured to each of the cylinder heads 4f, 4r; and a rocker arm 27 swingably supported by the rocker shaft 26.

The camshaft 25 has an intake cam 30 and an exhaust cam 31 protruding from the outer circumference of the camshaft 25 and is rotated in synchronization with the rotation of the crankshaft 2. The intake cam 30 and the exhaust cam 31 have a cam profile whose distance (radius) from the center to the outer circumference is not uniform. In this way, the intake cam 30 and the exhaust cam 31 are rotated to vary in radius to pump the intake valve 11 and the exhaust valve 12, respectively.

A valve lifter 13 is provided between the camshaft 25 and the intake valve 11 so as to be slidably fitted to each of the cylinder heads 4f, 4r at a position below the camshaft 25.

A roller 27a is provided at one end of the rocker arm 27 pivotally supported by the rocker shaft 26 so as to be in rolling contact with the exhaust cam 31. In addition, a tappet screw 27b in abutment against the upper end of the exhaust valve 12 is threadedly engaged with the other end of the rocker arm 27 so as to be able to adjust an advancement-retreat position.

The intake cam 30 and the exhaust cam 31 are rotated integrally with the camshaft 25 so that the intake cam 30 depresses the intake valve 11 via the valve lifter 13 and the exhaust cam 31 depresses the exhaust valve 12 via the rocker arm 27. In this way, the intake port 21 and the exhaust port 22 are opened and closed at predetermined timing determined by the rotational phase of the intake cam 30 and of the exhaust cam 31.

Figure 3:
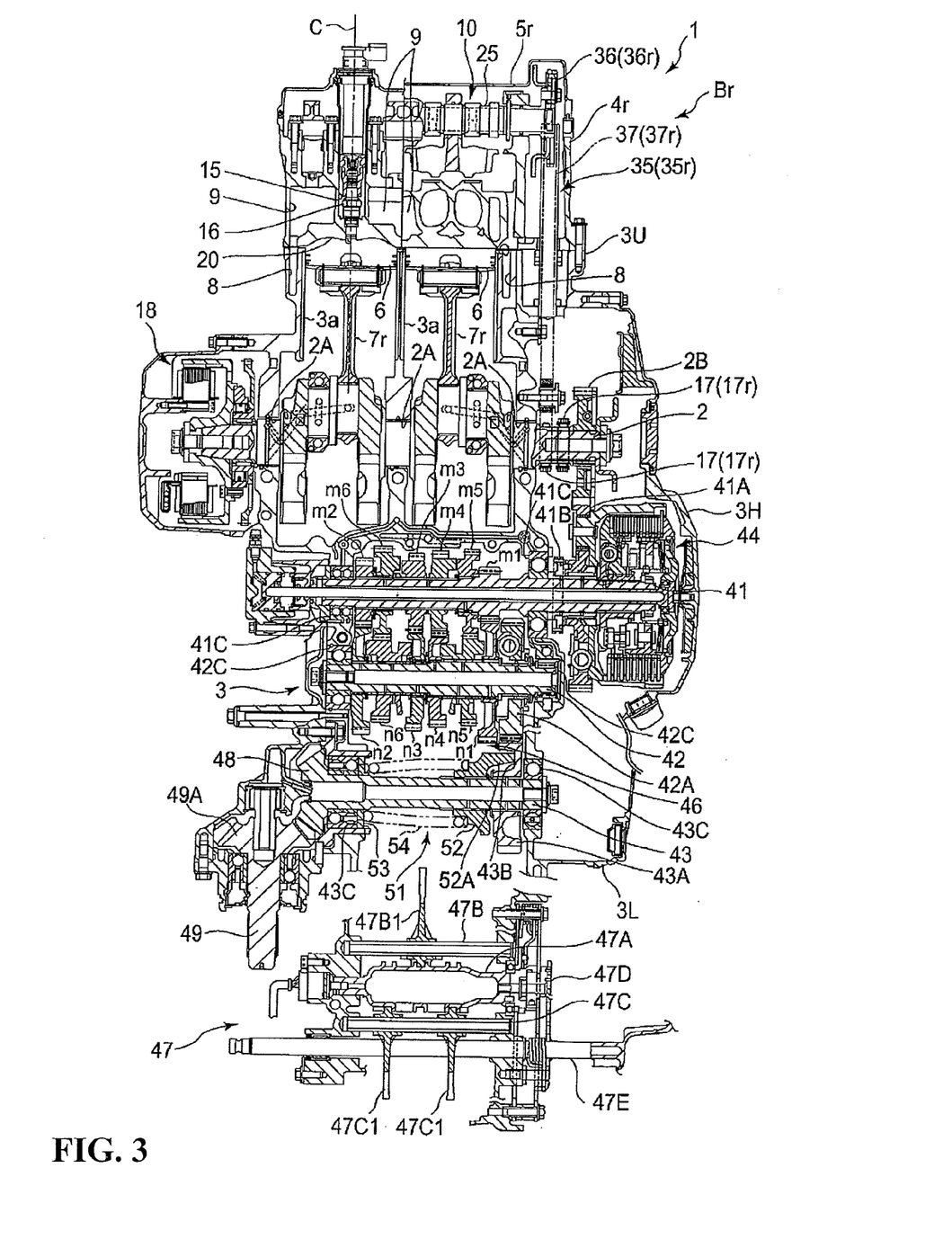
FIG. 3 is a cross-sectional view taken along line III-III of FIG. 2.

FIG. 3 is a cross-sectional view taken along line III-III of FIG. 2. FIG. 3 illustrates the cross-section of the rear bank Br. Since the inside of the front bank Bf is configured similarly to that of the rear bank Br, the explanation of the front bank Bf is omitted.

Referring to FIG. 3, a plug insertion hole 15 is formed in each cylinder of the cylinder head 4r and on cylinder axis C which is a central axis of the cylinder bore 3a. An ignition plug 16 (an ignition plug of the right cylinder is not illustrated) is disposed with its distal end facing the inside of the combustion chamber 20.

The crankshaft 2 is rotatably supported in the crankcase 3 via metal bearings 2A provided at both ends and an intermediate portion in the axial direction thereof.

A camshaft drive sprocket 17 adapted to output rotation of the crankshaft 2 is provided on one end side of the crankshaft 2. A cam chain chamber 35 is provided on the side of the camshaft drive sprocket 17 of the internal combustion engine 1 so as to extend vertically in each of the banks Bf, Br. A driven sprocket 36 rotated integrally with the camshaft 25 is secured to one end of the camshaft 25 and located in the cam chain chamber 35. An endless cam chain 37 is wound around the driven sprocket 36 and the camshaft drive sprocket 17. The camshaft 25 is designed to be rotated at half the rotational speed of the crankshaft 2 via the cam chain 37 and the driven sprocket 36.

A generator 18 as a dynamo is installed on the other end side of the crankshaft 2.

Further, a crankcase cover 3H is attached to the crankcase 3 so as to cover the vicinity of the crankshaft 2 from the side of the vehicle. The crankcase side cover 3H is installed to straddle an upper crankcase 3U and a lower crankcase 3L.

A main shaft 41, a counter shaft 42 and an output shaft 43 are each disposed in the crankcase 3 in parallel to the crankshaft 2. The shafts 41, 42, 43 including the crankshaft 2 constitute a gear transmission mechanism adapted to transmit the rotation of the crankshaft 2 in order of the main shaft 41, the counter shaft 42 and the output shaft 43.

As illustrated in FIG. 3, the crankshaft 2 is disposed on a mating surface 3S between the upper crankcase 3U and the lower crankcase 3L. The main shaft 41 is disposed rearward of the crankshaft 2 and the counter shaft 42 is disposed rearward of the main shaft 41. The main shaft 41 and the counter shaft 42 are disposed on the mating surface 3S. The output shaft 43 is disposed forward of and below the counter shaft 42. In other words, respective axial centers O1 and O2 of the main shaft 41 and the counter shaft 42 are located anteriorly and posteriorly, respectively, on the mating surface 3S and an axial center O3 of the output shaft 43 is located rearward of the axial center O1 of the main shaft 41 and forward of and below the axial center O2 of the counter shaft 42.

FIG. 3 is a cross-sectional view taken along a cross-section connecting the rear bank Br, the crankshaft 2, the main shaft 41, the counter shaft 42 and the output shaft 43 together with corresponding straight lines.

A crank-side drive gear 2B adapted to rotate the main shaft 41 is secured to an end of the crankshaft 2 on the side of the cam chain chamber 35. In addition, the crank-side drive gear 2B meshes with a main shaft-side driven gear 41A of the main shaft 41. The main shaft 41 is supported via bearings 41C provided at both the ends thereof.

The main shaft-side driven gear 41A is provided on the main shaft 41 for relative rotation and connected to a clutch mechanism 44. The operation of the clutch mechanism 44 can connect and disconnect the transmission of the power between the crankshaft 2 and the main shaft 41.

The main shaft-side driven gear 41A is provided with an oil pump drive gear 41B adapted to drive an oil pump 50 (see FIG. 2). The oil pump drive gear 41B is rotated integrally with the main shaft-side driven gear 41A regardless of on-and-off of the clutch mechanism 44. This transmits the rotation of the crankshaft 2 via the drive chain to a driven gear secured to a drive shaft 50A of the oil pump 50 for driving the oil pump 50 as illustrated in FIG. 2.

As illustrated in FIG. 3, the counter shaft 42 is supported by bearings 42C provided at both the ends thereof. Speed-change gear groups are arranged to straddle between the counter shaft 42 and the main shaft 41, which constitutes a transmission device 46. More specifically, drive gears for six speeds m1 to m6 are provided on the main shaft 41. Driven gears for six speeds n1 to n6 are provided on the counter shaft 42. The drive gears m1 to m6 and the driven gears n1 to n6 are such that corresponding speed-change stages mesh with each other to constitute speed-change gear pairs (gear combinations) corresponding thereto. The speed-change gear pairs are reduced in reduction ratio in order from first-speed to sixth-speed (i.e., become higher-speed gears). The first-speed gear pair m1, n1 largest in reduction ratio is disposed on one end side of the main shaft 41 supporting the main shaft-side driven gear 41A. The second-speed gear pair m2, n2 is disposed on the other end side of the main shaft 41. The fifth-speed gear pair m5, n5, the fourth-speed gear pair m4, n4, the third-speed gear pairs m3, n3 and the sixth-speed gear pairs m6, n6 are arranged between the first-speed gear pair m1, n1 and the second-speed gear pair m2, n2 in order from the one end side.

The third-speed drive gear m3 and the fourth-speed drive gear m4 on the main shaft 41 are integrally spline-connected to the main shaft 41. In addition, they can axially be shifted as a shifter and selectively attached or detached to or from the adjacent fifth-speed drive gear m5 or sixth-speed drive gear m6. The fifth-speed driven gear n5 and the sixth-speed driven gear n6 on the counter shaft 42 are configured to be spline-connected to the counter shaft 42. In addition, they can axially be shifted as a shifter and selectively attached or detached to or from the adjacent fourth-speed driven gear n4 or third-speed driven gear n3.

The third-speed drive gear m3 and fourth-speed drive gear m4 serving as a shifter on the main shaft 41 and the fifth-speed driven gear n5 and sixth-speed driven gear n6 on the counter shaft 42 are displaced by a speed-change switching mechanism 47 (see FIG. 2) for shifting.

As illustrated in FIG. 2, the speed-change switching mechanism 47 includes a shift drum 47A parallel to the shafts 41 to 43. The shift drum 47A is connected to a shift spindle (also called a shift shaft) 47E (see FIG. 3) via a ratchet mechanism 47D (see FIG. 3) for controlling a turning amount of the shift drum 47A. A gear change pedal (not illustrated) shift-operated by an operator is attached to an end (the left end of the vehicle body) of a shift spindle 47E. The gear change pedal is turned along with the shift-operation to turn the shift drum 47A via the ratchet mechanism 47D.

The shift drum 47A is disposed between and above the main shaft 41 and the counter shaft 42. In addition, the shift drum 47A is disposed so that its axial center O4 is located rearward of the axial center O3 of the output shaft 43. Fork shafts 47B and 47C are disposed forward and rearward, respectively, of and parallel to the shift drum 47A. The fork shaft 47B is disposed forward of the shift drum 47A so that its axial center O5 is located slightly below the axial center O4 of the shift drum 47A. The fork shaft 47C is disposed rearward of the shift drum 47A so that its axial center O6 is located at a height approximately equal to the axial center O4 of the shift drum 47A.

The fork shaft 47B supports a shift fork 47B1 to be engaged with the shifter of the main shaft 41. The fork shaft 47C supports a shift fork 47C1 to be engaged with the shifter of the counter shaft 42. The speed-change gear pairs are changed by shifting the shift forks 47B1, 47C1 of the speed-change switching mechanism 47. The rotation of the main shaft 41 is transmitted to the counter shaft 42 via a speed-change gear pair thus changed. As illustrated in FIG. 3, the counter shaft 42 has an intermediate drive gear 42A adapted to transmit the rotation of the counter shaft 42 to the output shaft 43.

The output shaft 43 is supported by bearings 43C provided at both ends of the counter shaft 42 and has a driven gear 43A meshing with the intermediate drive gear 42A. A cam-type torque damper 51 is disposed on the output shaft 43 adjacently to the driven gear 43A. The cam-type torque damper 51 is adapted to alleviate torque variations upon undergoing the same. The cam-type torque damper 51 is provided with a cylindrical member 52 which is spline-connected to the output shaft 43 in an axially shiftable manner. The cylindrical member 52 is formed, on an end face close to the driven gear 43A, with a projecting cam 52A meshing with a concave cam 43B formed on the driven gear 43A. A spring-receiving member 53 is secured to the general center of the output shaft 43. A coil spring 54 is installed between the cylindrical member 52 and the spring-receiving member 53 so as to bias the cylindrical member 52 toward the driven gear 43A. The cam-type torque damper 51 is configured to include the cylindrical member 52, the spring-receiving member 53 and the coil spring 54.

The output shaft 43 is provided at the left end integrally with a drive bevel-gear 48. The drive bevel-gear 48 meshes with a driven bevel-gear 49A provided integrally with a front end of a drive shaft 49. The drive shaft 49 extends in the back and forth direction of the vehicle body. This transmits the rotation of the output shaft 43 to the drive shaft 49.

An internal layout of the internal combustion engine 1 is next described with reference to FIG. 2.

In the internal combustion engine 1, the main shaft 41 is disposed rearward of the crankshaft 2 and the counter shaft 42 is disposed rearward of the main shaft 41. Therefore, the crankshaft 2, the main shaft 41 and the counter shaft 42 are arranged from the front to back in this order. Thus, the vertical length of the crankcase 3 can be shortened. With this configuration, although the main shaft-side driven gear 41A secured to the main shaft 41 is large in diameter, the main shaft-side driven gear 41 does not project upward compared with the case where the main shaft is disposed above the crankshaft and the counter shaft. Therefore, it is possible to suppress the upward protrusion of the crankcase 3. Thus, it is possible to dispose auxiliaries between the rear bank Br and the upper surface 3b of the crankcase 3.

Further, the main shaft 41 and the counter shaft 42 are disposed on the mating surface 3S between the upper and lower crankcases 3U, 3L. Therefore, the configurations of the bearings 41C, 42C of the main shaft 41 and the counter shaft 42 can be simplified to facilitate the assembly of the main shaft 41 and the counter shaft 42.

Since the output shaft 43 is disposed forward of the counter shaft 42, the back-and-forth length of the crankcase 3 can be shortened compared with the case where the output shaft 43 is disposed rearward of the counter shaft 42. The output shaft 43 is located below the counter shaft 42 and disposed at one of the apexes of a triangle along with the main shaft 41 and the counter shaft 42. The output shaft 43 is disposed by effective use of the space between the main shaft 41 and the counter shaft 42. It is possible to suppress the downward protrusion of the crankcase 3 resulting from the fact that the output shaft 43 is disposed forward of the counter shaft 42. Therefore, the back-and-forth length of the crankcase 3 can be shortened and additionally the vertical length of the crankcase 3 can be shortened. Thus, the internal combustion engine 1 can be reduced in size and weight.

In this way, since the back-and-forth length of the crankcase 3 can be shortened to shorten a wheelbase, it is possible to make the motorcycle 100 (see FIG. 1) compact and to improve the turning performance of the motorcycle 100.

Since the shift drum 47A is disposed between and above the main shaft 41 and the counter shaft 42, the back-and-forth length of the crankcase 3 can be shortened compared with the case where the shift drum 47A is disposed rearward of the counter shaft 42. The shift drum 47A is disposed at one of the apexes of a triangle along with the main shaft 41 and the counter shaft 42. The shift drum 47A is disposed by effective use of the space between the main shaft 41 and the counter shaft 42. Therefore, it is possible to suppress the upward protrusion of the crankcase 3 resulting from the fact that the shift drum 47a is disposed above the main shaft 41 and the counter shaft 42, and to shorten the vertical length of the crankcase 3. Thus, it is possible to arrange auxiliaries between the rear bank Br and the upper surface 3b of the crankcase 3. Thus, the distance between the shift drum 47A and the main shaft 41 and between the shift drum 47A and the counter shaft 42 can be reduced. Therefore, the shift forks 47B1, 47C1 supported by the respective fork shafts 47B, 47C can be shortened to make the internal combustion engine 1 small and light.

The shift drum 47A is disposed so that its axial center O4 is located rearward of the axial center O3 of the output shaft 43. Therefore, the vertical length of the crankcase 3 can be shortened compared with the case where the axial center of the shift drum and that of the output shaft are arranged one on the other. Thus, it is possible to arrange auxiliaries between the rear bank Br and the upper surface 3b of the crankcase 3.

In addition to this, the fork shaft 47B is disposed at one of the apexes of a triangle along with the main shaft 41 and the shift drum 47A. The fork shaft 47B is disposed by effective use of the space between the main shaft 41 and the shift drum 47A. Therefore, it is possible to suppress the upward protrusion of the crankcase 3 resulting from the fact that the fork shaft 47B is disposed above the main shaft 41, so that the vertical length of the crankcase 3 can be shortened. Thus, it is possible to arrange auxiliaries between the rear bank Br and the upper surface 3b of the crankcase 3. In addition, since the distance between the fork shaft 47B and the main shaft 41 and between the fork shaft 47B and the shift drum 47A can be reduced to shorten the shift fork 47B1 supported by the fork shaft 47B, the internal combustion engine 1 can be reduced in size and weight.

Similarly, the fork shaft 47C is disposed at one of the apexes of a triangle along with the counter shaft 42 and the shift drum 47A. The fork shaft 47C is disposed by effective use of the space between the counter shaft 42 and the shift drum 47A. Therefore, it is possible to suppress the upward protrusion of the crankcase 3 resulting from the fact that the fork shaft 47C is disposed above the counter shaft 42 and the vertical length of the crankcase 3 can be shortened. Thus, it is possible to arrange auxiliaries between the rear bank Br and the upper surface 3b of the crankcase 3. In addition, since the distance between the fork shaft 47C and the counter shaft 42 and between the fork shaft 47C and the shift drum 47A can be reduced to shorten the shift fork 47C1 supported by the fork shaft 47C, the internal combustion engine 1 can be reduced in size and weight.

Figure 4:
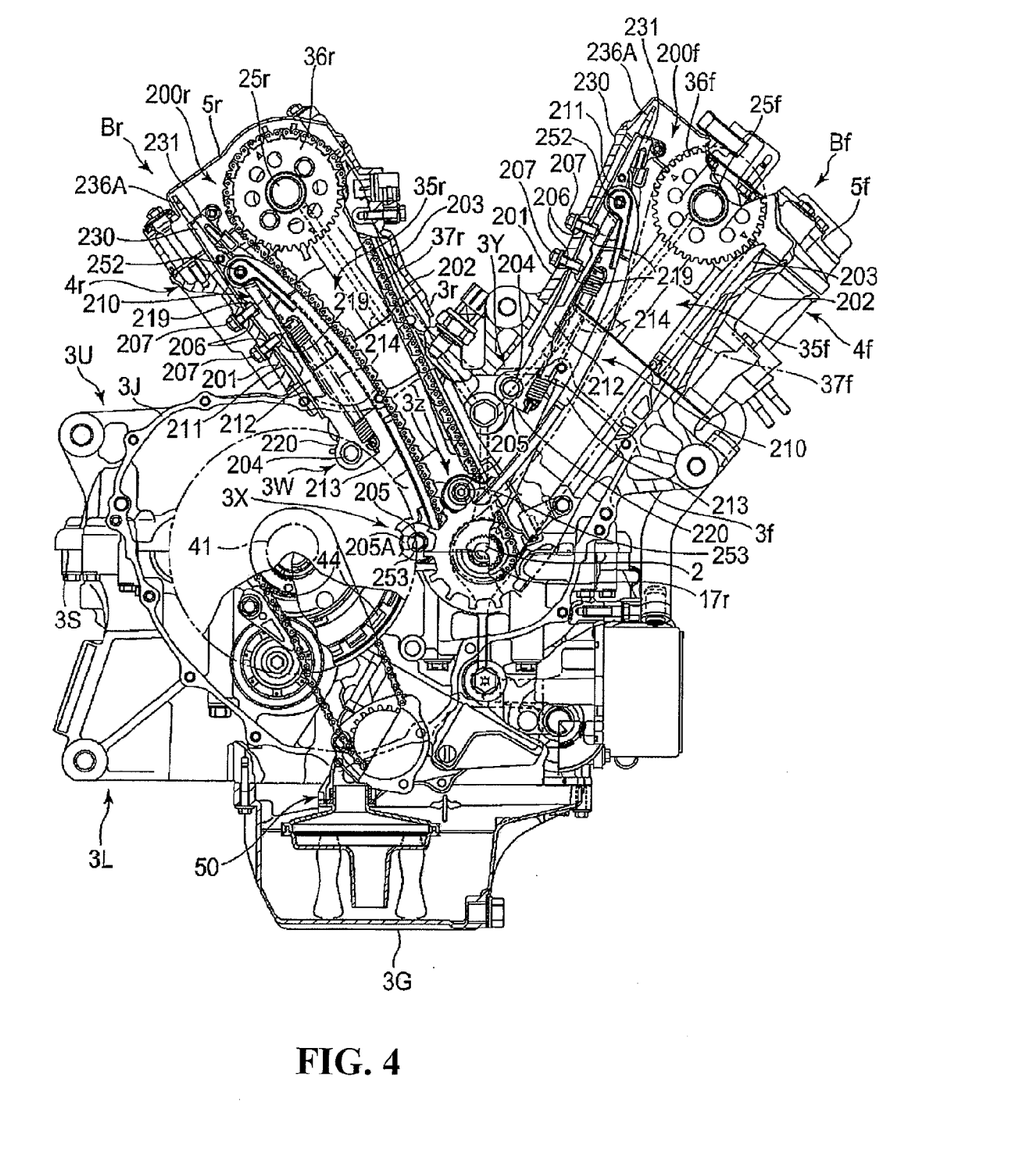
FIG. 4 is a partial broken-out cross-sectional view of the internal combustion engine as viewed from the right of a vehicle.

FIG. 4 is a partial broken-out cross-sectional view of the internal combustion engine 1 as viewed from the right of the vehicle. In addition, FIG. 4 illustrates a state where the crankcase side cover 3H is removed to expose the cam chain 37, the clutch mechanism 44, etc. A mating surface 3J is provided between the crankcase side cover 3H and the crankcase 3.

Referring to FIG. 4, chain transmission mechanisms 200f and 200r are installed in the front bank Bf and the rear bank Br, respectively, so as to transmit the rotation of the crankshaft 2 to the corresponding cam shafts 25. The chain transmission mechanisms 200f, 200r are each installed on the side of the clutch mechanism 44 in the vehicle-width direction. Also the cam chain chambers 35f and 35r housing the chain transmission mechanisms 200f and 200r in the front bank Bf and the rear bank Br, respectively, are each formed on the side of the clutch mechanism 44. The cam chain chambers 35f and 35r vertically pass through the respective cylinder heads 4f and 4r to allow the lateral portion of the upper crankcase 3U to communicate with the cylinder head covers 5f, 5r.

The chain transmission mechanism 200f of the front bank Bf includes a camshaft drive sprocket 17f provided on the right end of the crankshaft 2; a driven sprocket 36f secured to a camshaft 25f of the front bank Bf; and a cam chain 37f (endless chain) wound around the camshaft drive sprocket 17f and the driven sprocket 36f.

The chain transmission mechanism 200r of the rear bank Br includes a camshaft drive sprocket 17r (see FIG. 3) provided on the right end of the crankshaft 2 and on the inside of the camshaft drive sprocket 17f; a driven sprocket 36r secured to a camshaft 25r of the rear bank Br; and a cam chain 37r (endless chain) wound around the camshaft drive sprocket 17r and the driven sprocket 36r.

The chain transmission mechanisms 200f and 200r are provided with chain tensioners 210, 210 (chain tensioners for internal combustion engine) adapted to apply a tensile force to the cam chains 37f and 37r, respectively. The cam chains 37f, 37r are made by the respective chain tensioners 210, 210 to eliminate looseness so that their functions as timing chains are maintained, their noise is reduced during operation and their life spans are lengthened.

The chain tensioners 210, 210 have an elongate outer shape. In addition, the chain tensioners 210, 210 are installed in the cam chain chamber 35f of the front bank Bf and the cam chain chamber 35r of the rear bank Br, respectively. The chain tensioners 210, 210 are arranged to extend along the inner surfaces of respective rear walls 201 of the cam chain chambers 35f, 35r. In addition, the chain tensioners 210, 210 are provided to contact the corresponding rear surfaces of the cam chains 37f, 37r. More specifically, the cam chains 37f, 37r are provided so as to have respective longitudinal directions which are vertically oriented and to be generally parallel to the respective linear portions of the cam chains 37f, 37r located between the upper and lower sprockets. In addition, the cam chains 37f, 37r extend from the vicinity of the crankshaft 2 to the corresponding upper portions of the cylinder heads 4f, 4r, respectively.

A cam chain guide 203 is provided on each of the inner surfaces of the front walls 202 of the cam chain chambers 35f, 35r so as to extend along each of the inner surfaces of the cam chains 37f, 37r for guiding the corresponding cam chains 37f, 37r.

Figure 5:
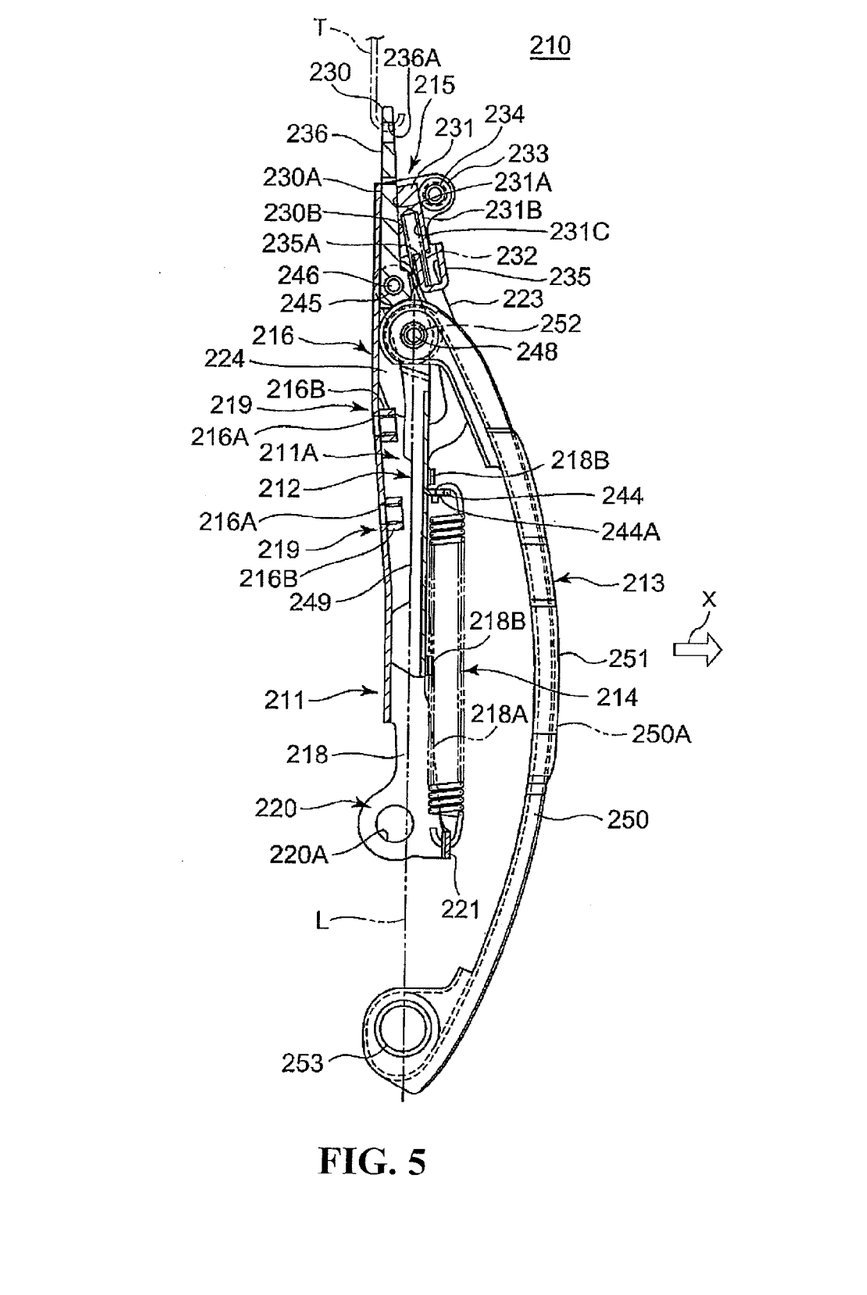
FIG. 5 is a partial broken-out lateral view of the chain tensioner.

FIG. 5 is a partial broken-out lateral view of the chain tensioner 210.

The chain tensioner 210 includes a base frame 211 (securing member); a slider plate 212 (movable member); a tensioner 213 (tensioner member); a helical extension spring 214 (spring); and a lock mechanism portion 215. The base frame 211 extends in a longitudinal direction and is secured to each of respective rear walls 201 of the cam chain chambers 35f, 35r. The slider plate 212 is shiftable in the extending direction of the base frame 211. The tensioner 213 is connected to the slider plate 212 and provided to straddle between the base frame 211 and the slider plate 212. The helical extension spring 214 is attached between the slider plate 212 and the base frame 211. The lock mechanism portion 215 is adapted to restrict the displacement of the slider plate 212.

The lock mechanism portion 215 includes a slide piece 230 connected to an upper portion of the slider plate 212; a wedge piece 231 engaged with the slide piece 230; a helical compression spring 232 adapted to push the wedge piece 231 against the slide piece 230; and a restrictive portion 233 adapted to restrict the position of the wedge piece 231.

Figure 6A:
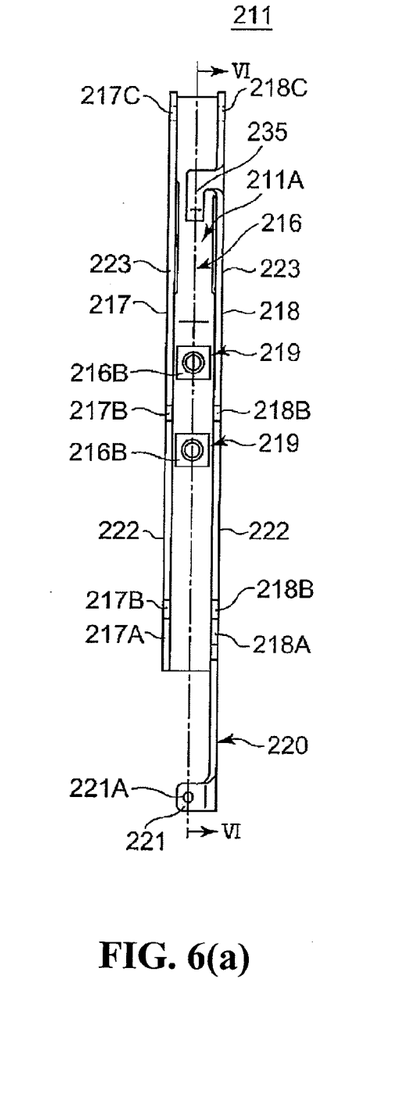
FIGS. 6(a) and 6(b) illustrate a base frame.
Figure 6B:
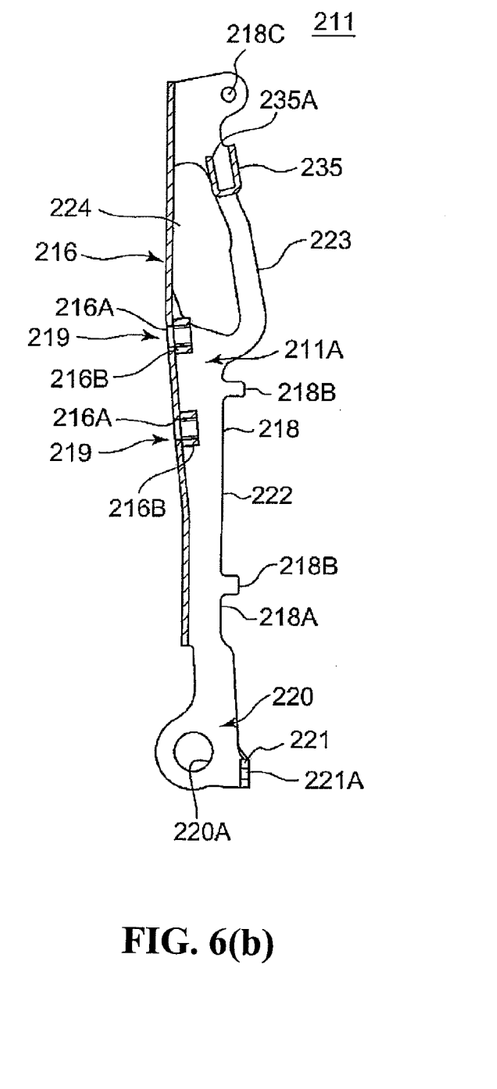

FIGS. 6(a) and 6(b) illustrate the base frame 211. FIG. 6(a) is a plan view and FIG. 6(b) is a cross-sectional view taken along line VI-VI of FIG. 6(a).

Referring to FIGS. 5, 6(a) and 6(b), the base frame 211 is configured to include a base wall 216 extending like a belt; and lateral walls 217, 218 extending vertically from corresponding longitudinally extending side-edges of the base wall 216 so as to be opposed to each other. The base frame 211 has a guide groove portion 211A which is surrounded by the base frame 216 and the lateral walls 217, 218 so as to be formed in a U-shape in cross-section. The slider plate 212 is received in the guide groove portion 211A.

An upper securing portion 219 is provided in a central portion of the base wall 216 at two positions vertically arranged in line so as to secure the base frame 211 to the rear wall 201. The upper securing portion 219 is configured to include a bolt insertion hole 216A passing through the base wall 216 and a nut 216B fixedly welded to the inner surface of the base wall 216 concentrically with the bolt insertion hole 216A. The upper securing portion 219 is provided at a position corresponding to each of a plurality of bolt holes 206 passing through the rear wall 201 of each of the cam chain chambers 35f, 35r. The base frame 211 is secured by the upper securing bolts 207 passed through the corresponding bolt holes 206.

The lateral wall 218 is formed with a lower securing portion 220 extending downward from a lower end of each of the base wall 216 and the lateral walls 217. The lower securing portion 220 has a securing hole 220A passing through the lateral wall 218. A lower securing bolt 204 (see FIG. 4) is inserted through the securing hole 220A to secure the base frame 211 to the crankcase 3. The base frame 211 is secured turnably around the lower securing bolt 204 via a collar (not illustrated) inserted into the fixing hole 220A along with the lower securing bolt 204.

The positions of the lower ends of the lateral walls 217 coincide with that of the lower end of the base wall 216.

The lateral walls 217, 218 are provided with respective lateral wall edge portions 217A, 218A which extend in the longitudinal direction and toward the side opposite the base wall 216. Each of the lateral wall edge portions 217A, 218A has a linear edge portion 222 at a longitudinally intermediate portion of the base frame 211. In addition, each of the lateral wall edge portions 217A, 218A has a projecting edge portion 223 which is located a longitudinally upper portion so as to further project toward the side opposite the base wall 216 from the linear edge portion 222.

A lower spring support portion 221 is provided at the lower end of the lateral wall 218. The lower spring support portion 221 is formed by folding the lateral wall edge portion 218A toward the lateral wall edge portion 217A. The lower spring support portion 221 is formed with a hole 221A adapted to hook a lower end of the helical extension spring 214.

The linear edge portion 222 of each of the lateral wall edge portions 217A, 218A is formed with a plurality of tongue-like projecting pieces 217B, 218B.

The restrictive portion 233 of the lock mechanism portion 215 is disposed at each of the longitudinal upper ends of the lateral walls 217, 218 and between the lateral wall 217 and the lateral wall 218. The restrictive portion 233 is formed like a cylindrical roller and supported by a pin 234 passing through the restrictive portion 233. The lateral walls 217, 218 are formed with respective through-holes 217C, 218C each supporting the pin 234.

As illustrated in FIG. 6(a), a folded portion 235 is provided below the through-holes 217C, 218C. In addition, the folded portion 235 is formed by folding a portion of the lateral wall edge portion 218A toward the lateral wall 217. In the side elevation of FIG. 6(b), the folded portion 235 is formed in a U-shape and a tip of the folded portion 235 located close to the base wall 216 is adapted to serve as an upwardly oriented compression spring support portion 235A. The helical compression spring 232 is supported by the compression spring support portion 235A inserted through its shaft portion from below.

An opening 224 is formed below the through-holes 217C, 218C and between each of the projecting edge portions 223 of the lateral walls 217, 218 and the base wall 216 so as to pass through each of the lateral walls 217, 218.

Figure 7A:
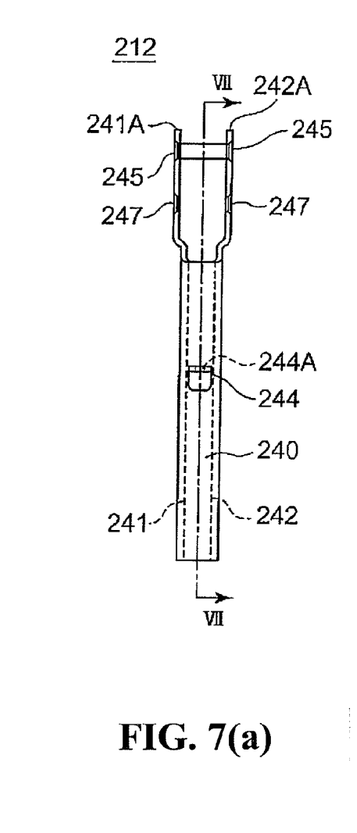
FIGS. 7(a) and 7(b) illustrate a slider plate.
Figure 7B:
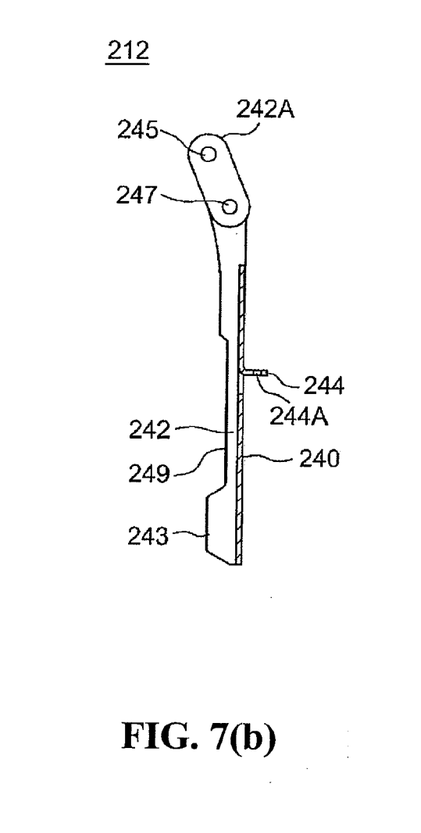

FIG. 7 illustrates the slider plate 212. FIG. 7(a) is a plan view and FIG. 7(b) is a cross-sectional view taken along line VII-VII of FIG. 7(a).

Referring to FIGS. 5, 7(a) and 7(b), the slider plate 212 is configured to include a base plate portion 240 extending like a belt and lateral wall portions 241, 242 which vertically extend from corresponding longitudinally extending side-edges of the base plate portion 240 so as to be opposed to each other. The slider plate 212 is vertically slidably received in the guide groove portion 211A and is assembled with each of the lateral wall portions 241, 242 coming into contact with the base wall 216 of the base frame 211. When the chain tensioner 210 is assembled, the projecting pieces 217B, 218B are folded inwardly to come into contact with the base plate portion 240 and the slider plate 212 is held by the guide groove portion 211A.

A contact portion 243 is formed at a lower portion of each of the lateral wall portions 241, 242 so as to come into slidable contact with the base wall 216. Each of the lateral wall portions 241, 242 is formed above the contact portion 243 with a runout portion 249 which is formed lower than the contact portion 243 so as to avoid the nut 216B.

An upper spring-support portion 244 is provided at the longitudinally intermediate portion of the base plate portion 240. The upper spring-support portion 244 is formed by cutting and raising the base plate portion 240 toward the side opposite the contact portion 243. The upper spring-support portion 244 is formed with a hole 244A adapted to hook the upper end of the helical extension spring 214.

The lateral wall portions 241, 242 extend further upward from the upper end of the base plate portion 240 to form respective extensions 241A, 242A shaped like a tuning fork in the upper portion of the slider plate 212. The extensions 241A, 242A are provided to face each other, having an interval therebetween wider than that between the lateral wall portions 241, 242.

Each of the extensions 241A, 242A is formed at an upper end with a slide piece connection hole 245 passing through extensions 241A, 242A. The slide piece 230 is pivotally supported by a connection pin 246 inserted through the slide piece connection hole 245.

The extensions 241A, 242A are formed below the slide piece connection holes 245 with respective tensioner connection holes 247 passing through the respective extensions 241A, 242A. The tensioner 213 is pivotally supported by a tensioner connection pin 248 inserted through the tensioner connection hole 247.

As illustrated in FIG. 5, the tensioner 213 has a framework formed of a body plate 250 formed by arcuately bending an elastically deformable belt-like metal plate. More specifically, a bending direction X of the tensioner 213 is a direction generally perpendicular to the extending direction of the base frame 211, i.e., a direction generally normal to the plane of the base wall 216, as indicated with an arrow in FIG. 5.

A rubber-made shoe 251 is printed on the external surface of the longitudinally intermediate portion 250A of the body plate 250. A synthetic resin-made sheet is attached to the external surface of the shoe 251 so as to form a slide contact surface between the outer surface of the shoe 251 and each of the cam chains 37f, 37r. This intends to protect the shoe 251 and to reduce frictional resistance against each of the cam chains 37f, 37r.

The tensioner 213 is formed at an upper end with a pin connection hole 252 (an upper end securing portion) adapted to receive the tensioner connection pin 248 inserted therethrough. The tensioner 213 is supported by the slider plate 212 so as to be turnable around the pin connection hole 252. The pin connection hole 252 and the slide piece connection hole 245 are provided at a position exposed from the opening 224 of each of the lateral walls 217, 218.

The tensioner 213 secured at the upper end to the slider plate 212 extends downward over the lower securing portion 220 of the base frame 211. In addition, the tensioner 213 is formed at a lower end with a lower end connection hole 253 (lower end securing portion) passing through the tensioner 213. The lower end connection hole 253 is secured to a lateral surface of the crankcase 3 by means of a lower end securing bolt 205 inserted through the lower end connection hole 253. The tensioner 213 is pivotally supported via a collar 205A inserted through the lower end connection hole 253 along with the lower end connection bolt 205 so as to be turnable around the lower end securing bolt 205.

The pin connection hole 252 and the lower end connection hole 253 are provided to have respective axes extending in a direction generally perpendicular to the bending direction X of the tensioner 213.

Between the pin connection hole 252 and the lower end connection hole 253, the helical extension spring 214 is spanned between the lower spring-support portion 221 of the base frame 211 and the upper spring-support portion 244 of the slider plate 212. In the state where the tensioner 213 is attached to each of the cam chain chambers 35f, 35r, the slider plate 212 is biased in the direction of pulling the slider plate 212 toward the lower spring-support portion 221. In other words, the tensioner 213 is biased by the helical extension spring 214 toward the lower spring-support portion 221 via the slider plate 212, i.e., undergoes force in the direction of increasing its degree of bending.

The slide piece 230 of the lock mechanism portion 215 is formed like a plate and includes a slide surface 230A in contact with the base wall 216 and a taper surface 230B formed to be tapered upward. The slide piece 230 has an upper projecting portion 236 coupled to the upper end of the slider plate 212 and projecting upward from the upper end of the base frame 211. The upper projecting portion 236 is formed with a hole portion 236A adapted to receive a tool T inserted thereinto. The tool T can be used to pull up the slider plate 212 via the slide piece 230.

The wedge piece 231 of the lock mechanism portion 215 includes an engaging surface 231A formed like a wedge and coming into contact with the taper surface 230B of the slide piece 230; and a wedge side taper surface 231B formed to be tapered upward and coming into contact with the restrictive portion 233. The wedge piece 231 is formed with a cylindrical spring-receiving hole 231C adapted to receive an upper portion of the helical compression spring 232 therein. The wedge piece 231 is constantly biased upward by the helical compression spring 232, i.e., undergoes force so as to operate as a wedge getting into between the slide piece 230 and the restrictive portion 233.

As illustrated in FIG. 4, the lower securing bolt 204 is fastened to a case-side securing portion 3W in the rear bank Br. This case-side securing portion 3W is provided in an upper portion of the upper crankcase 3U so as to be located on the back side of and overlap the clutch mechanism 44 as viewed from the side. The lower end securing bolt 205 is secured to a case-side securing portion 3X in the rear bank Br. This case-side securing portion 3X is provided forward of and close to the crankshaft 2 so as to be located on the back side of and overlap the clutch mechanism 44 as viewed from the side.

The lower securing bolt 204 is fastened to a case-side securing portion 3Y in the front bank Bf. This case-side securing portion 3Y is provided in an upper portion of the upper crankcase 3U between the front bank Bf and the rear bank Br. The lower end securing bolt 205 is fastened to a case-side securing portion 3Z in the front bank Bf. This case-side securing portion 3Z is provided close to above the crankshaft 2 so as to be located inside the cam chain 37r spanned between the upside and downside as viewed from the side.

A description is next given of the operation of the chain tensioner 210.

The chain tensioner 210 is curved in the bending direction X by the tensile force of the helical extension spring 214 to be pressed against the rear surface of each of the cam chains 37f, 37r. Thus, the chain tensioner 210 applies a predetermined tensile force to each of the cam chains 37f, 37r.

The cam chains 37f, 37r may be loose because of extension or the like. In such a case, the helical extension spring 214 pulls the slider plate 212 toward the lower securing portion 220 so that the tensioner 213 is further largely bent until it applies a predetermined tensile force to each of the cam chains 37f, 37r. At the same time, the slide piece 230 is shifted downward along with the slider plate 212, so that the wedge piece 231 biased by the helical compression spring 232 further deeply gets into between the slide piece 230 and the restrictive portion 233, the slider plate 212 coming into the lock state. The slider plate 212 having once been shifted downward is prevented from being again shifted upward. Thus, the tensioner 213 can press each of the cam chains 37f, 37r to constantly maintain the tensile force of each of the cam chains 37f, 37r in a given state.

For the time of maintenance or the like, if the chain tensioner 210 is removed, the locked state of the slider plate 212 can be released by pressing the wedge piece 231 from above.

A description is here given of a procedure for assembling the chain tensioner 210 to each of the rear bank Br and the front bank Bf.

The lower securing portion 220 and lower end connection hole 253 of the chain tensioner 210 are fastened to the case-side securing portions 3W and 3X, respectively, of the upper crankcase 3U by means of the lower securing bolt 204 and the lower end securing bolt 205, respectively. In this state, since the crankcase side cover 3H is not attached, the lower securing bolt 204 and the lower end securing bolt 205 can vertically be fastened from the side surface of the upper crankcase 3U in the bending direction X of the tensioner 213. The chain tensioner 210 is turnably supported by the lower securing portion 220 and the lower end connection hole 253; therefore, the chain tensioner 210 is turnable back and forth with the lower securing portion 220 and the lower end connection hole 253 serving as a fulcrum.

Next, the crankshaft 2 and the main shaft 41 are mounted to a mount portion of the upper crankcase 3U. At the same time, the cam chain 37r is wound around the camshaft drive sprocket 17r and the clutch mechanism 44 is mounted to the main shaft 41. After the clutch mechanism 44 has been mounted, the lower securing bolt 204 and the lower end securing bolt 205 cannot be fastened. Therefore, the fastening of the lower securing bolt 204 and the lower end securing bolt 205 can completely be carried out. In this way, the clutch mechanism 44 is made to overlap the lower securing bolt 204 and the lower end securing bolt 205. Thus, the lower securing bolt 204 and the lower end securing bolt 205 can be arranged in a compact manner.

The lower crankcase 3L is assembled to the upper crankcase 3U. Subsequently, while the cam chain 37r and the chain tensioner 210 are simultaneously passed through the cam chain chamber 35r of the rear cylinder head 4r, the rear cylinder head 4r is assembled to the rear cylinder block 3r. In this case, the chain tensioner 210 is turnable back and forth; therefore, when the chain tensioner 210 and the cam chain 37r are passed through the cam chain chamber 35r, they can positionally be adjusted to make it easy to be turned and passed through. Thus, assembly work is facilitated. The helical extension spring 214 is set to generate a predetermined biasing force in the state where the base wall 216 is in contact with the inner surface of the rear wall 201. Further, as illustrated in FIG. 5, the center of the securing hole 220A of the lower securing portion 220 is located on the side opposite the tensioner 213 with respect to a line segment L connecting the center of the pin connecting hole 252 with the center of the lower end connection hole 253. Therefore, when the chain tensioner 210 is turned, the distance between the securing hole 220A and the pin connection hole 252 will not become short. Thus, it is possible to prevent the disengagement of the helical extension spring 214 resulting from the turning of the chain tensioner 210.

Thereafter, the upper securing portion 219 of the base frame 211 is secured by means of the plurality of upper securing bolts 207 inserted through in the bending direction X of the tensioner 213 from the external surface of the rear wall 201 of the cam chain chamber 35r. In this case, the base frame 211 is positioned in the turnable state by the lower securing portion 220. Therefore, the position of the upper securing portion 219 will not be misaligned with respect to the position of each of the bolt holes 206 although the biasing force of the helical extension spring 214 is generated. Thus, assembly workability can be enhanced.

Next, the camshaft 25r integral with the driven sprocket 36r is assembled to the rear cylinder head 4r. Lastly, in the state where the lock mechanism portion 215 is released, the slider plate 212 is pulled upward with the tool T hooked in the hole portion 236A of the slider plate 212 to reduce the degree of bending of the tensioner 213. In this way, the cam chain 37r is made loose and wound around the driven sprocket 36r.

The assembly of the chain tensioner 210 of the front bank Bf is performed in the same procedure as the chain tensioner 210 of the rear bank Br described above. As illustrated in FIG. 3, the camshaft drive sprocket 17f of the front bank Bf is located on the vehicle-widthwise outside of the camshaft drive sprocket 17r of the rear bank Br. Therefore, the assembly of the case-side securing portions 3Y, 3Z is performed after the assembly of the case-side securing portions 3W, 3x. In the front bank Bf, the case-side securing portion 3Z is installed in the cam chain 37r; therefore, the lower end securing bolt 205 can be attached to or detached from in the cam chain 37r. Thus, workability is satisfactory.

As described above, according to the embodiment to which the present invention is applied, the securing hole 220A of the lower securing portion 220 of the base frame 211 is secured to the upper crankcase 3U. Therefore, when the upper securing portion 219 of the chain tensioner 210 is secured to the bolt hole 206 of the rear wall 201, the position of the base frame 211 is not misaligned even if the base frame 211 undergoes the biasing force of the helical extension spring 214 and/or the elastic force of the tensioner 213. Thus, the position of the upper securing portion 219 and that of the bolt hole 206 are not misaligned with each other so that the assembly workability of the chain tensioner 210 can be enhanced. The lower securing portion 220 located at a position facing the inside of the upper crankcase 3U is secured perpendicular to the bending direction X of the tensioner 213. Therefore, the tensioner 213 can be secured turnably and is not obstructive, so that assembly workability can be enhanced.

The lower end connection hole 253 of the tensioner 213 is pivotally supported in the vicinity of the crankshaft 2 and the securing hole 220A of the base frame 211 is located above the lower end connection hole 253. Therefore, the length of the base frame 211 can be shortened to reduce the weight thereof. Further, the lower end connection hole 253 of the tensioner 213 extends downward from the lower securing portion 220. Therefore, the maximum bending amount of the tensioner 213 can largely be ensured by ensuring the length of the tensioner 213. Thus, it is possible to deal with the larger looseness of each of the cam chains 37f, 37r.

The tensioner 213 and the base frame 211 are turnably supported by the lower securing bolt 205 and the lower securing bolt 204, respectively, so that the chain tensioner 210 is turnable. Therefore, when the chain tensioner 210 and the cam chain 37f are passed through the cam chain chamber 35f and the chain tensioner 210 and the cam chain 35r are passed through the cam chain chamber 35r, the chain tensioners 210 and the cam chains 37f, 37r can positionally be adjusted to make it easy to be turned and passed through. Thus, assembly workability can be enhanced.

Further, the securing hole 220A of the lower securing portion 220 is located on the side opposite the tensioner 213 with respect to the line segment L connecting the pin connection hole 252 with the lower end connection hole 253. Therefore, when the chain tensioner 210 is turned, the distance between the securing hole 220A and the pin connection hole 252 does not become short. Thus, it is possible to prevent the disengagement of the helical extension spring 214 resulting from the turning of the chain tensioner 210.

Furthermore, it is possible to pull the chain tensioner 210 upward by inserting the tool T into the hole portion 236A of the upper projecting portion 236 of the slider plate 212. Therefore, when the cam chains 37f, 37r are each removed, work for bringing the chain tensioner 210 into the extension state is facilitated.

The embodiment described above is one aspect of the present invention. As a matter of course, the embodiment can appropriately be modified in a range not departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain tensioner with an internal combustion engine, the internal combustion engine comprising an internal combustion engine main body, a crankshaft and a crankcase, the chain tensioner comprising:
   a securing member secured to the internal combustion engine main body;
   a movable member moveable with respect to the securing member in a first direction; and
   a tensioner member secured to the movable member, the tensioner member being elastically deformed and arcuately bent by the movable member biased and displaced in the first direction thereof to apply tensile force to an endless chain transmitting rotation of the crankshaft;
   wherein the securing member has an upper securing portion in an upper portion of the securing member to be secured to the internal combustion engine main body in a bending direction of the tensioner member, and has a lower securing portion extended to a position facing an inside of the crankcase and secured to the internal combustion engine main body perpendicularly to the bending direction of the tensioner member,
   wherein a bottom end of the lower securing portion of the securing member is located between a top end of the tensioner member and a bottom end of the tensioner member, and the bottom end of the lower securing portion of the securing member is a lowermost end of the securing member, and wherein a relative spatial relationship between the upper securing portion and the lower securing portion of the securing member, a relative spatial relationship between the top end and the bottom end of the lower securing portion of the securing member, and a relative spatial relationship between the top end and the bottom end of the tensioner member are defined by viewing the first direction as a vertical direction with respect to a ground,
   wherein a lower end securing portion of the tensioner member is pivotally supported by the crankcase, and the lower securing portion of the securing member is secured above a position where the bottom end of the tensioner member is pivotally supported,
   wherein the securing member is pivotally supported by the lower securing portion,
   wherein the movable member is biased by a spring toward the lower securing portion of the securing member, the spring being provided between an upper end securing portion and the lower end securing portion of the tensioner member,
   wherein the lower securing portion of the securing member is located on a side opposite the tensioner member with respect to a line segment connecting the lower end securing portion with upper end securing portion of the tensioner member,
   wherein the spring is attached between the movable member and the securing member, and
   wherein a lower spring support portion of the securing member is arranged below the position of the lower securing portion of the securing member.

2. The chain tensioner with the internal combustion engine according to claim 1, wherein the movable member is provided at an upper end with a hole portion adapted to receive a tool inserted therethrough, the tool being used to pull up the movable member.

3. The chain tensioner with the internal combustion engine according to claim 1, wherein said tensioner includes a lower end connection aperture pivotally supported adjacent to the crankshaft and the lower securing portion of the securing member is located above the lower end connection aperture.

4. The chain tensioner with the internal combustion engine according to claim 3, wherein the tensioner is pivotally supported by a bolt extending within the lower end connection aperture and the movable member is pivotally supported by a bolt extending within the lower securing portion of the securing member.

5. A chain tensioner with an internal combustion engine, the internal combustion engine comprising an internal combustion engine main body, a crankshaft and a crankcase, the chain tensioner comprising:
   a securing member adapted to be secured relative to the internal combustion engine main body;
   a movable member moveable with respect to the securing member in a first direction; and
   a tensioner member secured to the movable member, the tensioner member being elastically deformed and arcuately bent by the movable member biased and displaced in the first direction thereof to be adapted to apply tensile force to an endless chain transmitting rotation of a crankshaft;
   wherein the securing member has an upper securing portion in an upper portion of the securing member to be secured to the internal combustion engine main body in a bending direction of the tensioner member, and has a lower securing portion extended to a position facing an inside of the crankcase and secured to the internal combustion engine main body perpendicularly to the bending direction of the tensioner member,
   wherein a bottom end of the lower securing portion of the securing member is located between a top end of the tensioner member and a bottom end of the tensioner member, and the bottom end of the lower securing portion of the securing member is a lowermost end of the securing member, and wherein a relative spatial relationship between the upper securing portion and the lower securing portion of the securing member, a relative spatial relationship between the top end and the bottom end of the lower securing portion of the securing member, and a relative spatial relationship between the top end and the bottom end of the tensioner member are defined by viewing the first direction as a vertical direction with respect to a ground, wherein a lower end securing portion of the tensioner member is pivotally supported by the crankcase, and the lower securing portion of the securing member is secured above a position where the bottom end of the tensioner member is pivotally supported, wherein the securing member is pivotally supported by the lower securing portion, wherein the movable member is biased by a spring toward the lower securing portion of the securing member, the spring being provided between an upper end securing portion and the lower end securing portion of the tensioner member, wherein the lower securing portion of the securing member is located on a side opposite the tensioner member with respect to a line segment connecting the lower end securing portion with upper end securing portion of the tensioner member, wherein the spring is attached between the movable member and the securing member, and wherein a lower spring support portion of the securing member is arranged below the position of the lower securing portion of the securing member.

6. The chain tensioner with the internal combustion engine according to claim 5, wherein the movable member is provided at an upper end with a hole portion adapted to receive a tool inserted therethrough, the tool being used to pull up the movable member.

7. The chain tensioner with the internal combustion engine according to claim 5, wherein said tensioner includes a lower end connection aperture pivotally supported adjacent to the crankshaft and the lower securing portion of the securing member is located above the lower end connection aperture.

8. The chain tensioner with the internal combustion engine according to claim 7, wherein the tensioner is pivotally supported by a bolt extending within the lower end connection aperture and the movable member is pivotally supported by a bolt extending within the lower securing portion of the securing member.

* * * * *